United States Patent Office.

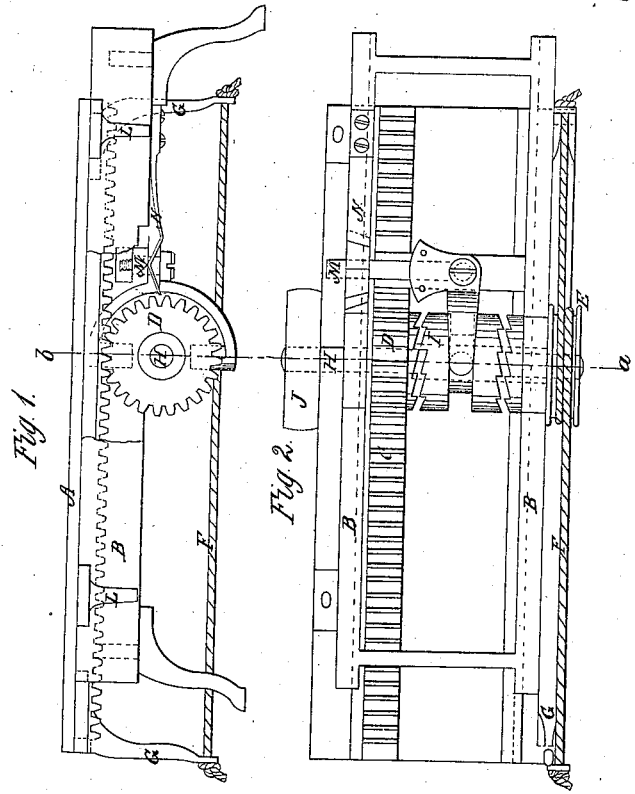

CHARLES F. HADLEY, OF CHICOPEE, MASSACHUSETTS, ASSIGNOR TO CLIFFORD ARRICK.

*Letters Patent No. 88,163, dated March 23, 1869.*

DEVICE FOR CONVERTING ROTARY INTO RECIPROCATING RECTILINEAR MOTION.

The Schedule referred to in these Letters Patent and making part of the same.

*To all whom it may concern:*

Be it known that I, CHARLES F. HADLEY, of Chicopee, in the county of Hampden, and State of Massachusetts, have invented a new and improved Device for Converting Rotary into Reciprocating Rectilinear Motion; and I do hereby declare that the following is a full, clear, and exact description thereof, reference being had to the accompanying drawings, and the letters of reference marked thereon.

The nature of my invention consists in the arrangement of means whereby a rotary may be converted into an even and continual reciprocating rectilinear motion, forming a substitute for the crank.

Figure 1 is a plan of my invention.

Figure 2 is a longitudinal elevation.

Figure 3 is a transverse section, taken through the line *a b* on fig. 2.

The slider A is fitted to move freely on the frame B, by dovetail ways, and moved one way by the rack C and pinion D, and the reverse, by the drum E and cord F, and the arms G G attached to each end of the slider A.

The pinion D and drum E are fitted to run loose on the driving-shaft H, and operated by the clutch I, fitted to the shaft H by a spline, or feather.

On the end of the shaft H is the driving-pulley J.

The motion is reversed by the dogs L L attached to each end of the slider A.

To operate this machine, move the pulley to the right, the clutch being in connection with the pinion. The slider moves in the same direction until one of the dogs L strikes the lever W, which disconnects the clutch from the pinion D, when, by the force of the spring N, it immediately connects with the drum E, reversing the motion of the slider A, thereby giving a continual reciprocating motion while the power is applied.

What I claim as new, and desire to secure by Letters Patent, is—

1. The arrangement of the rack C, pinion D, and clutch I, in combination with the drum E, cord F, and arms G G attached to the slider A, in the manner and for the purpose set forth.

2. The arrangement by which motion is obtained for the slider A from opposite sides of the pinion D and drum E, or equivalents, in combination with the rack C, or cord F and clutch I, in the manner and for the purpose above described.

CHAS. F. HADLEY.

Witnesses:
GEO. D. ROBINSON,
JAS. M. SMITH.